United States Patent
Karino (10) Patent No.: US 9,088,473 B2
(45) Date of Patent: Jul. 21, 2015

(54) DATA COMMUNICATION SYSTEM, DATA CARRIER DRIVING APPARATUS, AND DATA CARRIER APPARATUS

(71) Applicant: CANON KABUSHIKI KAISHA, Tokyo (JP)

(72) Inventor: Kenichi Karino, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/102,956

(22) Filed: Dec. 11, 2013

(65) Prior Publication Data

US 2014/0169443 A1   Jun. 19, 2014

(30) Foreign Application Priority Data

Dec. 18, 2012   (JP) ................. 2012-276115

(51) Int. Cl.
*H03K 7/08* (2006.01)
*H03K 9/08* (2006.01)
*H04L 25/49* (2006.01)

(52) U.S. Cl.
CPC ................. *H04L 25/4902* (2013.01)

(58) Field of Classification Search
None
See application file for complete search history.

(56) References Cited

U.S. PATENT DOCUMENTS 5,990,716 A * 11/1999 Chen .................... 327/172
2006/0098691 A1 * 5/2006 Yamazaki ............. 370/518

FOREIGN PATENT DOCUMENTS

| JP | 2003-069653 | 3/2003 |
| JP | 2006-135888 | 5/2006 |
| JP | 2006-173707 | 6/2006 |
| JP | 4393351 | 1/2010 |

* cited by examiner

*Primary Examiner* — Chieh M Fan
*Assistant Examiner* — Wednel Cadeau
(74) *Attorney, Agent, or Firm* — Fitzpatrick, Cella, Harper & Scinto (57) ABSTRACT

In a data communication system according to one aspect of the present invention, a data carrier driving apparatus, which communicates with a data carrier apparatus using a rectification smoothing circuit for generating a power supply voltage, controls a pulse width of each pulse of a clock signal (pulse voltage) supplied to the data carrier apparatus. The data carrier driving apparatus sets the duration of each pulse of a pulse voltage generated by the data carrier driving apparatus, so as to suppress a decrease in the level of the pulse voltage caused by a charging operation for the rectification smoothing circuit, particularly, such that the duration in which the pulse voltage becomes a high-level voltage is longer than or equal to the duration in which the pulse voltage becomes a low-level voltage during one period.

9 Claims, 6 Drawing Sheets

DATA COMMUNICATION SYSTEM, DATA CARRIER DRIVING APPARATUS, AND DATA CARRIER APPARATUS

BACKGROUND OF THE INVENTION

1. Field of the Invention

The present invention relates to a data communication system including a data carrier driving apparatus and a data carrier apparatus, and in particular to data communication between the data carrier driving apparatus and the data carrier apparatus.

2. Description of the Related Art

Japanese Patent No. 4393351 describes an example of a configuration that, in a system in which a data carrier driving apparatus and a data carrier apparatus perform data communication, enables bidirectional data communication via two contacts for the purpose of downsizing the system. In order to further improve the versatility of the data carrier apparatus in the data communication system described in Japanese Patent No. 4393351, a generous-purpose microcomputer and a highly-functional memory chip may be used in a circuit in the data carrier apparatus.

However, the above conventional technique has the following problem. When a microcomputer and a highly-functional memory chip are used in a circuit in a data carrier apparatus, this circuit shall be configured using discrete components; this could possibly restrict the space for arranging components in realization of a small data carrier apparatus. In view of this, to avoid an increase in the size of the data carrier apparatus, a rectification smoothing circuit, which can be implemented with a small number of components, may be used as a voltage generation circuit in the data carrier apparatus. That is to say, a voltage is obtained by rectifying and smoothing a clock pulse signal supplied from a data carrier driving apparatus using the rectification smoothing circuit in the data carrier apparatus, and the obtained voltage is used as a power supply voltage for the microcomputer and the memory chip.

When the rectification smoothing circuit is used in the data carrier apparatus as a circuit for generating a power supply voltage, the size of the data carrier apparatus can be kept small. However, if a peak value of a charging current increases during an operation for charging a capacitor (capacitance element) used in the rectification smoothing circuit, a relatively large current could possibly flow from the data carrier driving apparatus to the data carrier apparatus. This could possibly lead to a temporary decrease in the level of a clock pulse signal (pulse voltage) supplied from the data carrier driving apparatus to the data carrier apparatus, and a decrease in the detection accuracy for the clock pulse signal in the data carrier apparatus. As a result, there is a possibility that stable data communication is difficult to perform between the data carrier driving apparatus and the data carrier apparatus.

SUMMARY OF THE INVENTION

The present invention has been made in view of the above problem. The present invention provides a technique to realize stable data communication between a data carrier driving apparatus and a data carrier apparatus while maintaining a small, inexpensive configuration in a two-contact data communication system.

According to one aspect of the present invention, there is provided a data communication system including a data carrier driving apparatus and a data carrier apparatus that perform data communication via a first contact and a second contact, the data carrier apparatus comprising: a rectification smoothing circuit configured to include a rectification element and a capacitance element, and to rectify and smooth a pulse voltage input from the data carrier driving apparatus via the first contact, and outputs the rectified and smoothed pulse voltage, the rectification element and the capacitance element being connected in series between the first contact and the second contact; a pulse detection unit configured to detect the pulse voltage that is input from the data carrier driving apparatus and applied to the rectification smoothing circuit; and a first control unit, that is connected to the rectification smoothing circuit, configured to operate using a voltage output from the rectification smoothing circuit as a power supply voltage, and to identify transmission data from the data carrier driving apparatus based on a pulse width of the pulse voltage detected by the pulse detection unit, the data carrier driving apparatus comprising: a current detection element configured to detect a current flowing from the data carrier driving apparatus to the data carrier apparatus via the first contact as an output current corresponding to transmission data from the data carrier apparatus; a pulse generation circuit configured to generate a pulse voltage that periodically alternates between a high-level voltage and a low-level voltage using a voltage output to the data carrier apparatus via the second contact as a reference voltage, and to output the generated pulse voltage to the data carrier apparatus via the current detection element and the first contact; and a second control unit configured to control a per-period pulse width of the pulse voltage generated by the pulse generation circuit in accordance with transmission data to transmit data to the data carrier apparatus, wherein the second control unit when transmitting first data to the data carrier apparatus, sets the per-period pulse width to a first pulse width with which a time frame of the high-level voltage is longer than or equal to a time frame of the low-level voltage, and when transmitting second data to the data carrier apparatus, sets the per-period pulse width to a second pulse width that is larger than the first pulse width.

According to another aspect of the present invention, there is provided a data carrier driving apparatus that performs data communication with a data carrier apparatus via a first contact and a second contact, the data carrier driving apparatus comprising: a current detection element configured to detect a current flowing from the data carrier driving apparatus to the data carrier apparatus via the first contact as an output current corresponding to transmission data from the data carrier apparatus; a pulse generation circuit configured to generate a pulse voltage that periodically alternates between a high-level voltage and a low-level voltage using a voltage output to the data carrier apparatus via the second contact as a reference voltage, and to output the generated pulse voltage to the data carrier apparatus via the current detection element and the first contact; and a control unit configured to control a per-period pulse width of the pulse voltage generated by the pulse generation circuit in accordance with transmission data to transmit data to the data carrier apparatus, wherein the control unit when transmitting first data to the data carrier apparatus, sets the per-period pulse width to a first pulse width with which a time frame of the high-level voltage is longer than or equal to a time frame of the low-level voltage, and when transmitting second data to the data carrier apparatus, sets the per-period pulse width to a second pulse width that is larger than the first pulse width.

According to still another aspect of the present invention, there is provided a data carrier apparatus that performs data communication with a data carrier driving apparatus via a first contact and a second contact, the data carrier apparatus comprising: a rectification smoothing circuit configured to include a rectification element and a capacitance element, and to rectify and smooth a pulse voltage input from the data carrier driving apparatus via the first contact, and outputs the rectified and smoothed pulse voltage, the rectification element and the capacitance element being connected in series between the first contact and the second contact, and the pulse voltage periodically alternating between a high-level voltage and a low-level voltage; a pulse detection unit configured to detect the pulse voltage that is input from the data carrier driving apparatus and applied to the rectification smoothing circuit; a control unit, that is connected to the rectification smoothing circuit, configured to operate using a voltage output from the rectification smoothing circuit as a power supply voltage, and to identify transmission data from the data carrier driving apparatus based on a pulse width of the pulse voltage detected by the pulse detection unit; a current load that is connected in parallel with the rectification smoothing circuit between the first contact and the second contact; and a switching element that is connected in parallel with the rectification smoothing circuit and in series with the current load, between the first contact and the second contact, and configured to be switchable between a conductive state and a non-conductive state, wherein the control unit when transmitting data to the data carrier driving apparatus, sets a transmission period for transmitting each data such that the transmission period is made up of: a time frame in which the pulse voltage detected by the pulse detection unit is the low-level voltage; and a subsequent time frame in which the pulse voltage detected by the pulse detection unit is the high-level voltage, when transmitting first data to the data carrier driving apparatus, places the switching element in the non-conductive state during the transmission period, and when transmitting second data to the data carrier driving apparatus, switches the switching element from the non-conductive state to the conductive state during a time frame of the low-level voltage, and switches the switching element from the conductive state to the non-conductive state during a time frame of the high-level voltage.

The present invention can provide a technique to realize stable data communication between a data carrier driving apparatus and a data carrier apparatus while maintaining a small, inexpensive configuration in a two-contact data carrier communication system.

Further features of the present invention will become apparent from the following description of exemplary embodiments (with reference to the attached drawings).

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

First Embodiment

The following describes a first embodiment of the present invention with reference to FIGS. 1, 2 and 4 to 6. First, a description will be given of a comparative example with respect to the first embodiment and a later-describe second embodiment with reference to FIGS. 4 to 6, so as to facilitate the understanding of these embodiments.

Comparative Example of Data Communication System

Figure 4:
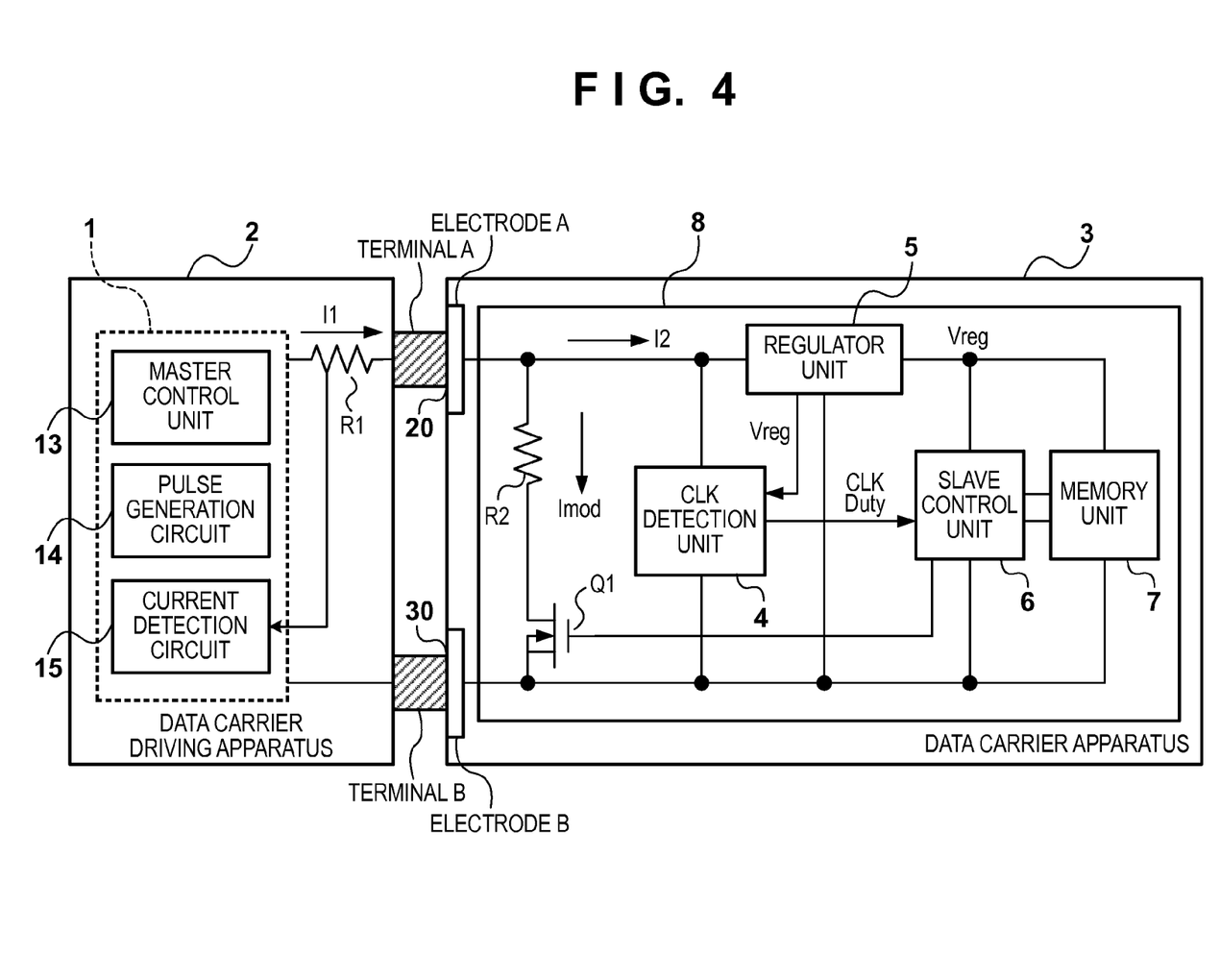
FIG. 4 shows a configuration of a data communication system serving as a comparative example.

FIG. 4 shows a configuration of a data communication system that serves as a comparative example with respect to the embodiments of the present invention. As shown in FIG. 4, the data communication system includes a data carrier driving apparatus 2 and a data carrier apparatus 3, which can perform bidirectional data communication only via two contacts 20 and 30 for the purpose of downsizing the system. An electric circuit 8 in the data carrier apparatus 3 is formed as one semiconductor chip.

The data carrier driving apparatus 2 has two terminals A and B. On the other hand, the data carrier apparatus 3 has two electrodes A and B that respectively correspond to the terminals A and B of the data carrier driving apparatus 2. While the electrodes A and B are respectively in physical contact with the terminals A and B, communication lines for two signals are established between the data carrier driving apparatus 2 and the data carrier apparatus 3, and the two apparatuses can perform data communication with each other via these two contacts 20 and 30.

The data carrier driving apparatus 2 includes a control circuit 1, which is composed of a master control unit 13, a pulse generation circuit 14, and a current detection circuit 15. The master control unit 13 controls the pulse generation circuit 14 and the current detection circuit 15 for generation of data to be transmitted to the data carrier apparatus 3, and for transmission/reception of data to/from the data carrier apparatus 3. The data carrier driving apparatus 2 also includes a current detection resistor R1 for converting an output current I1 flowing in the data carrier driving apparatus 2 into a voltage. The current detection circuit 15 detects the output current I1 (data reading) based on the voltage converted by the current detection resistor R1. The master control unit 13 identifies transmission data from the data carrier apparatus 3 based on the result of detection of the output current I1 by the current detection circuit 15.

Figure 5:
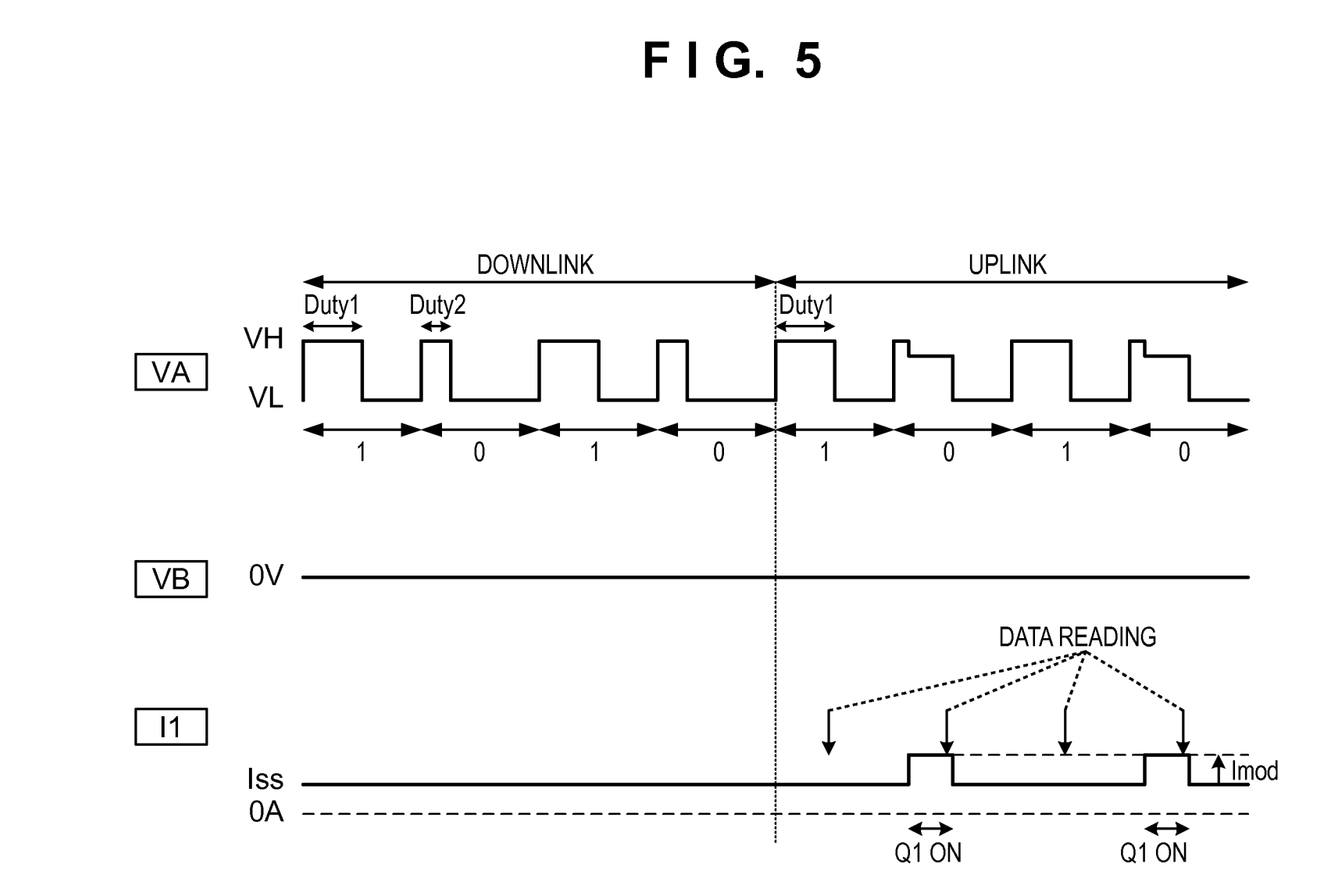
FIG. 5 shows examples of operational waveforms of components in the data communication system serving as the comparative example.

The data carrier driving apparatus 2 inputs (applies) a pulse voltage VA and a reference voltage VB generated by the pulse generation circuit 14 respectively to the electrodes A and B of the data carrier apparatus 3 via the terminals A and B. FIG. 5 shows operational waveforms of components in the data communication system shown in FIG. 4. More specifically, FIG. 5 shows waveforms of the pulse voltage VA, the reference voltage VB, and the output current I1.

The pulse voltage VA is made up of a periodic pulse sequence in which the amplitude takes two values, i.e. a high-level (VH) value and a low-level (VL) value, at a constant frequency. As shown in FIG. 5, in the pulse voltage VA input to the electrode A of the data carrier apparatus 3, the amplitude alternates between these two values, i.e. the high-level (VH) value and the low-level (VL) value, at a constant frequency. On the other hand, a voltage of a ground (GND) potential (=0 V) is input to the electrode B of the data carrier apparatus 3 as the reference voltage.

(Downlink Data Communication)

Data transmission from the data carrier driving apparatus 2 to the data carrier apparatus 3 is hereinafter referred to as "downlink transmission". The data carrier driving apparatus 2 transmits data "1" and data "0" to the data carrier apparatus 3 by changing a duty ratio of pulses of the pulse voltage VA. More specifically, when transmitting data "1", the data carrier driving apparatus 2 sets a pulse of the pulse voltage VA such that a duty ratio is approximately 50% (Duty1), the duty ratio being the percent of a time frame in which the pulse voltage VA is VH in one period of the pulse voltage VA that alternates between VH and VL. On the other hand, when transmitting data "0", the data carrier driving apparatus 2 sets a pulse of the pulse voltage VA such that a duty ratio is smaller than Duty1 (that is to say, a time frame in which the pulse voltage VA is VH is short compared to the case of Duty1).

A CLK detection unit 4 in the data carrier apparatus 3 detects the pulse voltage VA that is input from the data carrier driving apparatus 2 and applied to a regulator unit 5. More specifically, the CLK detection unit 4 detects a rising edge or a falling edge of an amplitude component of the pulse voltage VA input via the electrode A, as well as a pulse width of each pulse, and transfers the detection result to a slave control unit 6. The slave control unit 6 synchronizes communication and detects downlink data based on the transferred detection result.

(Uplink Data Communication)

Data transmission from the data carrier apparatus 3 to the data carrier driving apparatus 2 is hereinafter referred to as "uplink transmission". In the data carrier apparatus 3, to cause the CLK detection unit 4, the slave control unit 6 and a memory unit 7 to operate at the time of uplink transmission, the regulator unit 5 generates a fixed voltage Vreg and supplies the generated fixed voltage Vreg to each of these units. A consumption current I2, which flows in the CLK detection unit 4, the slave control unit 6 and the memory unit 7, is substantially averaged by the regulator unit 5 to have a substantially constant value Iss. Therefore, as shown in FIG. 5, the output current I1 has a constant value Iss (while a transistor Q1 is off).

When performing uplink transmission to the data carrier driving apparatus 2, the data carrier apparatus 3 operates as follows. Based on data to be transmitted ("1" or "0"), the slave control unit 6 turns off or on the transistor Q1 at a timing of data reading by the data carrier driving apparatus 2.

As shown in FIG. 5, when transmitting data "0" to the data carrier driving apparatus 2 via the uplink, the slave control unit 6 turns on the transistor Q1 during a time frame in which the pulse voltage VA is VH. This places the transistor Q1 in a conductive state, makes the electrodes A and B short-circuited via a resistor R2, and makes a modulation current Imod flow in the resistor R2. As a result, the output current I1 from the data carrier driving apparatus 2 to the data carrier apparatus 3 becomes equivalent to a current obtained by adding the modulation current Imod to the consumption current I2 (=Iss) (i.e., Iss+Imod).

On the other hand, when transmitting data "1" to the data carrier driving apparatus via the uplink, the slave control unit 6 turns off the transistor Q1 during a time frame in which the pulse voltage VA is VH. This places the transistor Q1 in a non-conductive state, prevents the modulation current Imod from flowing in the resistor R2, and makes only the consumption current I2 (=Iss) flow as the output current I1.

The data carrier apparatus 3 changes the output current I1 that flows in the data carrier driving apparatus 2 by turning on or off the transistor Q1 in accordance with transmission data during a time frame in which the pulse voltage VA is VH in the above manner. The data carrier driving apparatus 2 receives uplink data from the data carrier apparatus 3 by converting the output current I1 into a voltage using the current detection resistor R1 and detecting the output current I1 using the current detection circuit 15 (data reading) based on the converted voltage.

<Configuration of Data Communication System 100>

Figure 1:
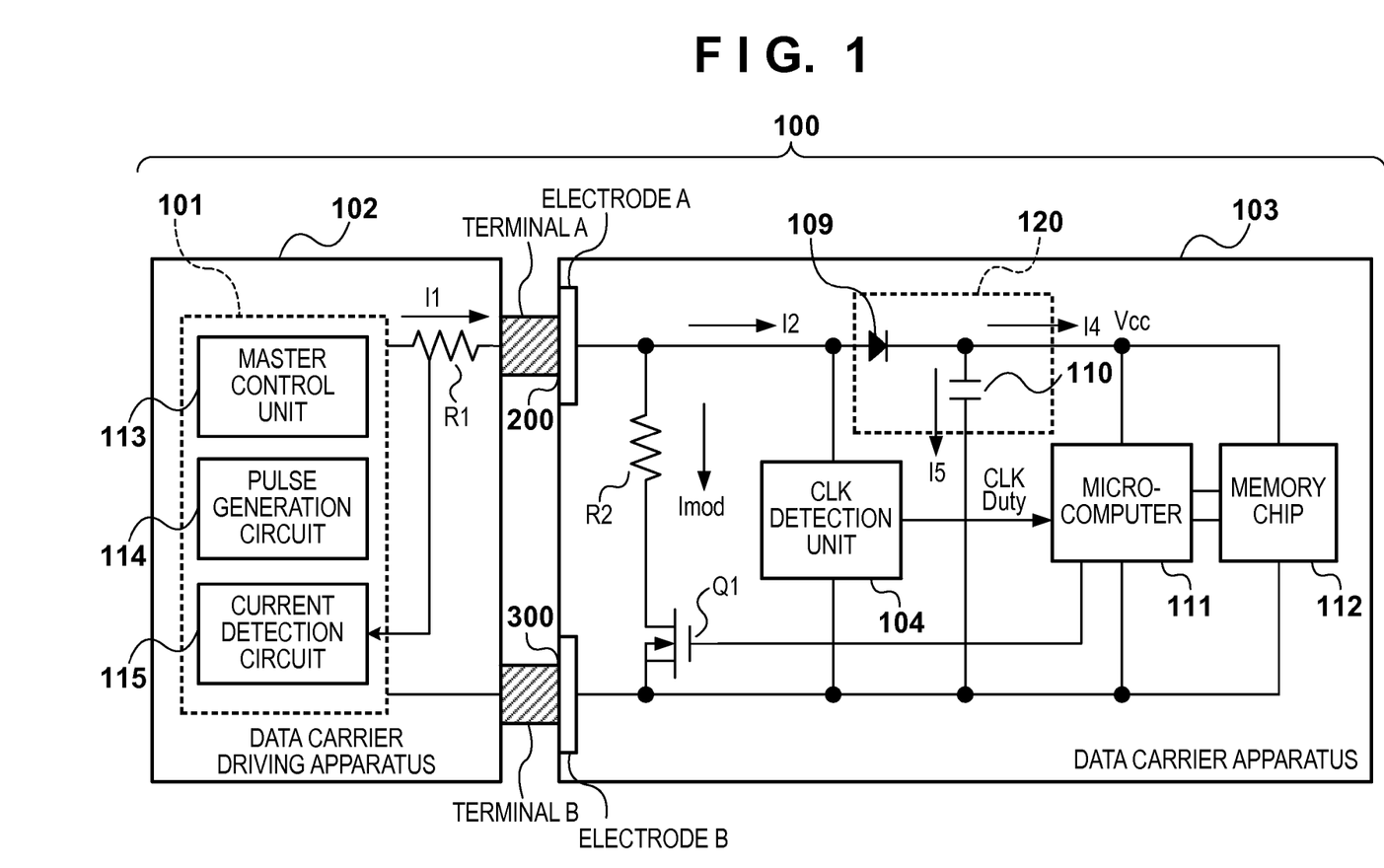
FIG. 1 shows a configuration of a data communication system 100 according to first and second embodiments of the present invention.

Next, with reference to FIG. 1, a description is now given of a configuration of a data communication system 100 according to the embodiments of the present invention. The data communication system 100 includes a data carrier driving apparatus 102 and a data carrier apparatus 103. As shown in FIG. 1, the data carrier driving apparatus 102 and the data carrier apparatus 103 communicate with each other via the following two contacts: a first contact 200 via which a terminal A and an electrode A come into contact with each other; and a second contact 300 via which a terminal B and an electrode B come into contact with each other. That is to say, the data communication system 100 is a two-contact data carrier communication system similarly to the data communication system according to the comparative example.

A configuration of the data carrier driving apparatus 102 according to the present embodiment is basically similar to a configuration of the data carrier driving apparatus 2 according to the comparative example (FIG. 4). The control circuit 1, the current detection resistor R1, the master control unit 13, the pulse generation circuit 14, and the current detection circuit 15 shown in FIG. 4 correspond to a control circuit 101, a current detection resistor R1, a master control unit 113, a pulse generation circuit 114, and a current detection circuit 115 shown in FIG. 1, respectively. Note that the current detection resistor R1 is an example of a current detection element, and the master control unit 113 is an example of a second control unit.

In the data carrier driving apparatus 102, the pulse generation circuit 114 generates a pulse voltage VA by using, as a reference voltage, a voltage VB output to the data carrier apparatus 103 via the second contact 300. As described above, the pulse voltage VA is a pulse signal that periodically alternates between a high-level voltage (VH) and a low-level voltage (VL). The pulse generation circuit 114 outputs the generated pulse voltage VA to the data carrier apparatus 103 via the resistor R1 and the first contact 200.

In the data carrier driving apparatus 102, the resistor R1 is used to detect a current that flows from the data carrier driving apparatus 102 to the data carrier apparatus 103 as an output current corresponding to transmission data from the data carrier apparatus 103. The current detection circuit 115 monitors the current flowing in the resistor R1, and detects an output current I1 based on a voltage converted by the resistor R1. The master control unit 113 identifies (uplink) transmission data from the data carrier apparatus 103 based on the result of detection of the output current by the current detection circuit 115. Furthermore, when transmitting downlink data to the data carrier apparatus 103, the master control unit 113 controls a per-period pulse width of the pulse voltage VA generated by the pulse generation circuit 114 in accordance with data to be transmitted. More specifically, when transmitting data of "0" or "1" (first data or second data), the master control unit 113 controls the pulse generation circuit 114 such that each pulse of the output pulse voltage VA has a pulse width corresponding to each data.

On the other hand, the data carrier apparatus 103 according to the present embodiment includes a CLK detection unit 104, a microcomputer 111, a memory chip 112, a resistor R2, and a transistor Q1 as elements corresponding to the CLK detection unit 4, the slave control unit 6, the memory unit 7, the resistor R2, and the transistor Q1 in the data carrier apparatus 3 according to the comparative example (FIG. 4), respectively. Note that the CLK detection unit 104 is an example of a pulse detection unit, and the microcomputer 111 is an example of a first control unit. Also, the resistor R2 is an example of a current load, and the transistor Q1 is an example of a switching element.

As shown in FIG. 1, the resistor R2 is connected, in parallel with a later-described rectification smoothing circuit 120, between the electrode A (first contact 200) and the electrode B (second contact 300). Furthermore, the transistor Q1 is connected in parallel with the rectification smoothing circuit 120, and in series with the resistor R2, between the electrode A (first contact 200) and the electrode B (second contact 300). The microcomputer 111 can switch the transistor Q1 between a conductive state and a non-conductive state by controlling the transistor Q1 to be in an on state or an off state.

In the data carrier apparatus 103, the CLK detection unit 104 detects the pulse voltage VA that is input from the data carrier driving apparatus 102 and applied to the rectification smoothing circuit 120. The CLK detection unit 104 transfers the result of detection of the pulse voltage VA to the microcomputer 111. The microcomputer 111 executes synchronization processing related to data communication with the data carrier driving apparatus 102 based on the transferred detection result. The microcomputer 111 also identifies (downlink) transmission data from the data carrier driving apparatus 102 based on a pulse width of the pulse voltage VA detected by the CLK detection unit 104.

When transmitting uplink data to the data carrier driving apparatus 102, the microcomputer 111 places the transistor Q1 in the on state or the off state in accordance with data to be transmitted, at a timing of data reading by the data carrier driving apparatus 102. This makes it possible to change the output current I1 that flows in the resistor R1 in the data carrier driving apparatus 102 (that is to say, a current that flows from the data carrier driving apparatus 102 to the data carrier apparatus 103 via the resistor R1 and the first contact 200). More specifically, the output current I1 switches between a consumption current I2 flowing in the rectification smoothing circuit 120 and a current obtained by adding, to the consumption current I2, a modulation current Imod flowing in the resistor R2. When transmitting data of "0" or "1" (first data or second data), the microcomputer 111 places the transistor Q1 in a state (on or off) corresponding to each data.

Note that the correspondence of data of "0" and data of "1" to the pulse widths of the pulse voltage VA in the downlink, or to the states of the transistor Q1 in the uplink, may be the reverse of the correspondence described below. That is to say, the first data and the second data may correspond respectively to "0" and 1", or may correspond respectively to "1" and "0".

The electric circuit 8 in the data carrier apparatus 3 according to the comparative example shown in FIG. 4 is formed as one customized semiconductor chip. However, in consideration of versatility, there are cases where a general-purpose microcomputer and a highly-functional memory chip are used in an electric circuit in a data carrier apparatus as in the present embodiment. In such cases, the electric circuit in the data carrier apparatus shall be configured using discrete components; this leads to restriction in the space for arranging components in realization of a small data carrier apparatus. In particular, realization of the regulator unit 5 in the data carrier apparatus 3 shown in FIG. 4 using discrete components may lead to an increase in the number of components, and hence the size of the data carrier apparatus 3.

In view of the above, as shown in FIG. 1, the data carrier apparatus 103 according to the present embodiment uses the rectification smoothing circuit 120, which is composed of a rectification diode 109 (rectification element) and a smoothing capacitor 110 (capacitance element), as a simple voltage generation circuit that serves as an alternative to the regulator unit 5. As shown in FIG. 1, the rectification diode 109 and the smoothing capacitor 110 are connected in series between the electrode A (first contact 200) and the electrode B (second contact 300). The rectification smoothing circuit 120 rectifies and smoothes a pulse voltage input from the data carrier driving apparatus 102 through the operations of the rectification diode 109 and the smoothing capacitor 110, and outputs the rectified/smoothed pulse voltage. The microcomputer 111 and the memory chip 112, which are connected to the rectification smoothing circuit 120, operate using the voltage output from the rectification smoothing circuit 120 as a power supply voltage. As described above, the rectification smoothing circuit 120 can be configured using only two components, and therefore the size thereof can be kept small.

However, when a general-purpose microcomputer (microcomputer 111) and a highly-functional memory chip (memory chip 112) are used in the data carrier apparatus 103, there is a possibility that a power supply current I4 for operating them increases as compared to a configuration with the customized semiconductor chip shown in FIG. 4. Furthermore, depending on the operational states of the general-purpose microcomputer and the highly-functional memory chip, there is also a possibility that the power supply current I4 fluctuates significantly.

In the data carrier apparatus 103 that uses the rectification smoothing circuit 120 as shown in FIG. 1, the consumption current I2 flows only when the rectification diode 109 is conductive. In contrast, the power supply current I4, which is output from the rectification smoothing circuit 120 and consumed by the microcomputer 111 and the memory chip 112, is consumed even when the rectification diode 109 is not conductive. It is thus necessary to charge the smoothing capacitor 110 by an amount of electric charge to be consumed by the microcomputer 111 and the memory chip 112 while the rectification diode 109 is in a conductive state. Therefore, while the rectification diode 109 is in a conductive state, a charging current I5 for charging the smoothing capacitor 110 and the power supply current I4 flow intensively in the data carrier apparatus 103, giving rise to the possibility that a value of the consumption current I2 becomes large momentarily.

Figure 6:
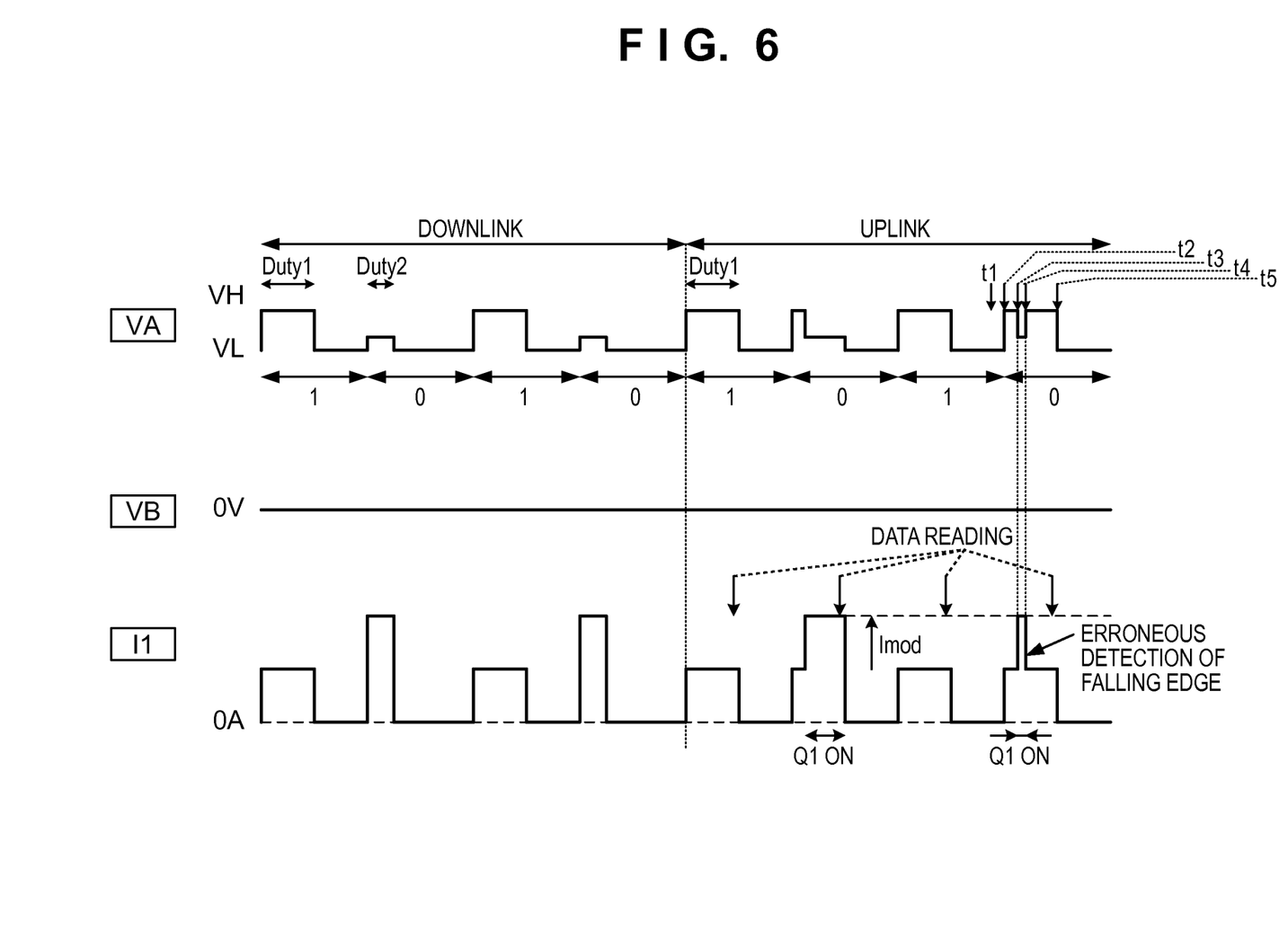
FIG. 6 shows examples of operational waveforms of components in the data communication system 100 for the case where error occurs in data reading via an uplink.

FIG. 6 shows examples of operational waveforms of components in the data communication system 100 that uses the rectification smoothing circuit 120, for the case error occurs in uplink data reading. As shown in FIG. 6, the output current I1 (that is to say, the consumption current I2) flows in the data carrier driving apparatus 102 and the data carrier apparatus 103, especially during a time frame in which the pulse voltage VA becomes a high-level voltage (VH). This makes a peak value of the output current I1 (consumption current I2) large compared to the case of the comparative example (FIG. 5). In particular, when a pulse of the pulse voltage VA has a small pulse width (Duty2), the output current I1 (consumption current I2) flows intensively in a shorter amount of time, and therefore the peak value further increases.

Provided that the peak value of the output current I1 (consumption current I2) is Iss_Pk, Iss_Pk has a certain degree of tolerance as a result of changes in the power supply current I4 depending on the operational states of the microcomputer 111 and the memory chip 112 and on variations in the performances thereof. A maximum value and a minimum value of Iss_Pk depending on such a tolerance are hereinafter referred to as Iss_Pk_Max and Iss_Pk_Min, respectively.

On the other hand, a current value of the modulation current Imod changes depending on variations in the performances of the resistor R1, the resistor R2 and the transistor Q1, and on the tolerance of the pulse voltage VA. A maximum value and a minimum value of Imod are hereinafter referred to as Imod_Max and Imod_Min, respectively.

In the data communication system 100, at the time of data communication via the uplink, data is transmitted by the data carrier apparatus 103 (microcomputer 111) turning off or on the transistor Q1 to change the output current I1 flowing in the current detection resistor R1. The data carrier driving apparatus 102 identifies transmission data from the data carrier apparatus 103 by discriminating between the following two states: the state where only Iss_Pk flows in the current detection resistor R1; and the state where Iss_Pk+Imod flows in the current detection resistor R1. The data carrier driving apparatus 102 sets a threshold Ith between Iss_Pk and Iss_Pk+Imod, the threshold Ith being for discriminating between current values of the output current I1 flowing in the current detection resistor R1.

In consideration of the aforementioned fluctuation in the modulation current Imod and in the peak value Iss_Pk of the output current I1 (consumption current I2), it is necessary to set the threshold Ith to a value that satisfies the following expression.

$$Iss\_Pk\_Max < Ith < Iss\_Pk\_Min + I mod\_Min \quad (1)$$

The following can be derived from Expression (1).

$$Iss\_Pk\_Min + I mod\_Min > Iss\_Pk\_Max \quad (2)$$

Therefore, if IssPk_Min+Imod_Min becomes smaller than Iss_Pk_Max, there is a possibility that the data carrier driving apparatus 102 cannot correctly detect transmission data from the data carrier apparatus 103. Moreover, the following Expression (3) can be derived by further modifying Expression (2).

$$I mod\_Min > Iss\_Pk\_Max - Iss\_Pk\_Min \quad (3)$$

It can be understood from Expression (3) that the larger the difference between the maximum value Iss_Pk_Max and the minimum value Iss_Pk_Min of the peak value Iss_Pk of the consumption current I2, the more it is necessary to increase Imod.

As described above, in the case of the data communication system 100 that uses the general-purpose microcomputer 111 and the memory chip 112 as shown in FIG. 1, it is necessary to set the modulation current Imod to a large value as compared to the case of the data communication system with a semiconductor chip configuration according to the comparative example shown in FIG. 4. This is because, as described above, the power supply current I4 could possibly fluctuate significantly in the data communication system 100 depending on variations in the performances of the elements and on a change in the operational states of the microcomputer 111 and the memory chip 112. That is to say, the consumption current I2, which is made up of the power supply current I4 and the charging current I5, could possibly fluctuate significantly, giving rise to the possibility that the modulation current Imod needs to be set to a large value accordingly.

In view of the above, in order to realize more stable data communication in the small, inexpensive data communication system 100 using the general-purpose microcomputer 111 and the memory chip 112, the following problems need to be addressed.

Firstly, it is necessary to compensate for a decrease in the signal detection accuracy in the CLK detection unit 104 associated with an increase in the peak value Iss_Pk of the consumption current I2 (output current I1). More specifically, an increase in the peak value Iss_Pk of the consumption current I2 leads to an increase in a voltage drop in the current detection resistor R1 built in the data carrier driving apparatus 102. This causes the pulse voltage VA generated by the pulse generation circuit 114 to decay due to the voltage drop in the current detection resistor R1, thereby decreasing the high level (VH) of the pulse voltage VA applied to the data carrier apparatus 103 via the electrode A. As a result, in the data carrier apparatus 103, the amplitude of the pulse voltage VA decreases; this could possibly make it difficult for the CLK detection unit 104 to detect the pulse voltage VA, that is to say, to perform signal detection. Therefore, it is necessary to compensate for a decrease in the signal detection accuracy (that is to say, the detection accuracy for reception data) in the CLK detection unit 104 associated with the aforementioned decrease in the pulse voltage VA.

Secondly, it is necessary to further increase the modulation current Imod, which flows as a result of turning off/on the transistor Q1 for allowing data transmission from the data carrier apparatus 103 via the uplink, in response to an increase in the consumption current I2 made up of the power supply current I4 and the charging current I5. However, when the data carrier apparatus 103 uses the rectification smoothing circuit 120, the peak value Iss_Pk of the consumption current I2 increases, and therefore it is necessary to further increase the modulation current Imod accordingly. This makes a decrease in the amplitude of the pulse voltage VA more prominent as described above, giving rise to the possibility that the following error occurs in the operation of data transmission from the data carrier apparatus 103 via the uplink.

It will be assumed that the data carrier apparatus 103 alternately transmits data "1" and data "0" in data transmission via the uplink as shown in FIG. 6. After data "1" is transmitted for the second time, the pulse voltage VA becomes a low-level voltage (VL) at timing t1. Thereafter, when the pulse voltage VA changes from VL to a high-level voltage (VH) at timing t2, the data carrier apparatus 103 starts transmission of the next data "0".

More specifically, after the pulse voltage VA changed from VL to VH at timing t2, the data carrier apparatus 103 turns on the transistor Q1 at timing t3 using the microcomputer 111. Then, the consumption current Imod starts to flow, and a current obtained by adding the consumption current I2 and the consumption current Imod starts to flow as the output current I1 in the data carrier driving apparatus 102. As a result, the pulse voltage VA markedly decreases (VH approaches VL) due to a voltage drop in the current detection resistor R1. The larger the consumption current Imod is, the more VH approaches VL, and there is a possibility that a decrease in the pulse voltage VA upon switching the transistor Q1 from off to on is erroneously detected by the CLK detection unit 104 as a falling edge of the pulse voltage VA.

When the CLK detection unit 104 detects a falling edge of the pulse voltage VA, the microcomputer 111 switches the transistor Q1 from on to off at timing t4. Subsequently, at timing t5 when the data carrier driving apparatus 102 performs data reading, the data carrier driving apparatus 102 (master control unit 113) erroneously detects data "0" as data "1". In other words, in the case of uplink data communication, there is a possibility that the detection accuracy for reception data decreases in the data carrier driving apparatus 102, and it is necessary to compensate for such a decrease in the detection accuracy.

<Operations of Data Communication System 100>

In the data communication system 100 according to the present embodiment, the data carrier apparatus 103 controls the pulse width of the pulse voltage VA at the time of downlink and uplink data communication, so as to reduce the amount of decrease in the pulse voltage VA input to the data carrier apparatus 103. In this way, the detection accuracy for reception data is increased in the data carrier apparatus 103 and the data carrier driving apparatus 102, both in downlink data communication and in uplink data communication.

Figure 2:
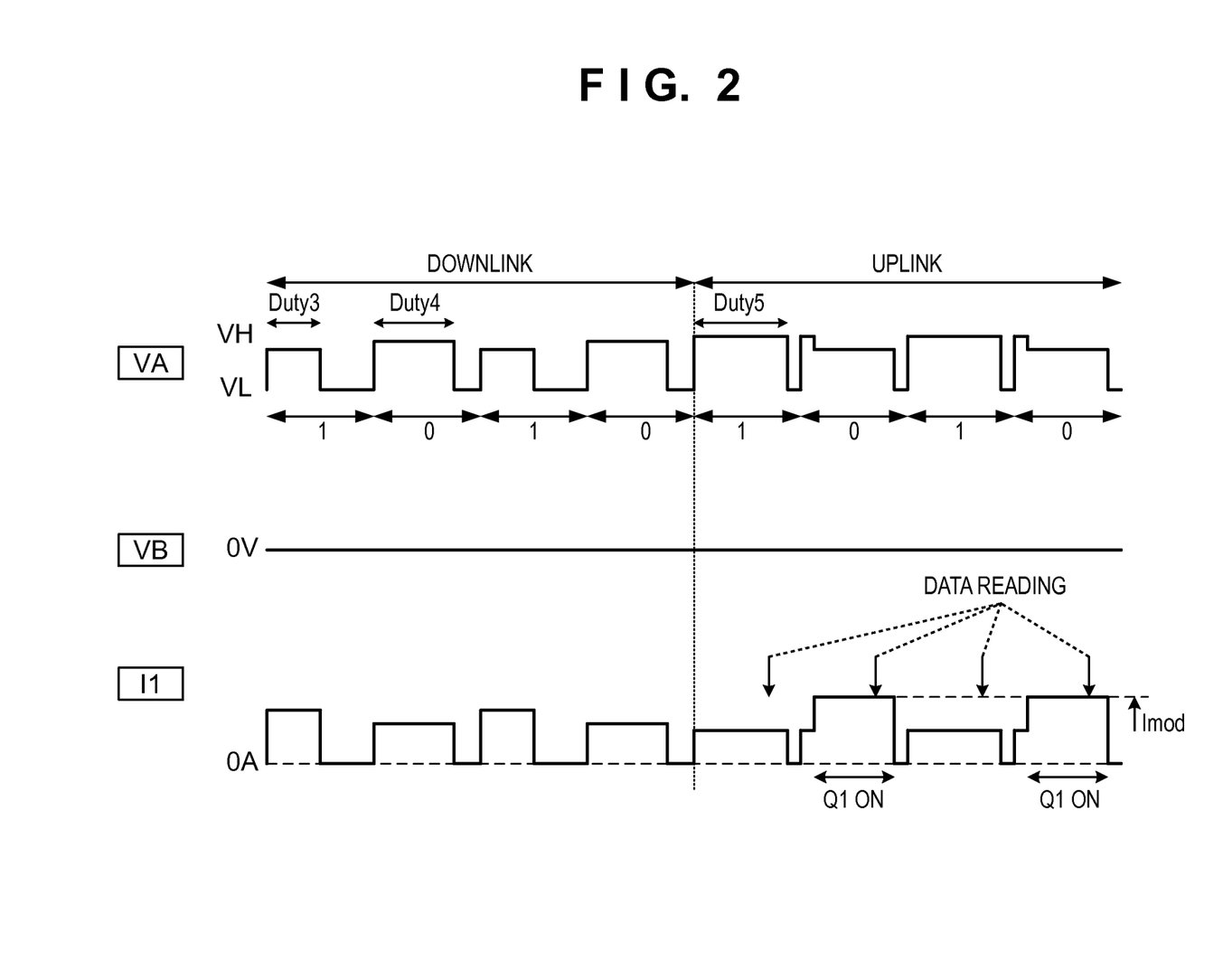
FIG. 2 shows examples of operational waveforms of components in the data communication system 100 according to the first embodiment of the present invention.

With reference to FIG. 2, the following describes a method for controlling the pulse width of the pulse voltage VA according to the present embodiment for each of downlink data communication and uplink data communication. Note that the pulse width of the pulse voltage VA is controlled by the master control unit 113 controlling the pulse generation circuit 114. FIG. 2 shows operational waveforms of components in the data carrier driving apparatus 102 and the data carrier apparatus 103 in the data communication system 100 according to the first embodiment of the present invention.

(Downlink Data Communication)

In the present embodiment, at the time of data communication via the downlink, the master control unit 113 controls (extends) the pulse width of the pulse voltage VA to the extent that the peak value of the output current I1 can be suppressed, and that a decrease in the pulse voltage VA can be suppressed upon detection by the CLK detection unit 104. More specifically, when transmitting data "1" (first data), the master control unit 113 sets the duty ratio (Duty3) of a pulse of one period in the pulse voltage VA to 50% or more (in the present embodiment, Duty3=50% as shown in FIG. 2). That is to say, the master control unit 113 sets the pulse width of one pulse corresponding to data "1" (first pulse width) such that a time frame of a high-level voltage (VH) is longer than or equal to a time frame of a low-level voltage (VL).

On the other hand, when transmitting data "0" (second data), the master control unit 113 makes the duty ratio (Duty4) of a pulse of one period in the pulse voltage VA larger than the duty ratio for transmission of data "1" (in the present embodiment, Duty4=75% as shown in FIG. 2). That is to say, the master control unit 113 makes the pulse width of one pulse corresponding to data "0" (the second pulse width) larger than the pulse width of one pulse corresponding to data "1" (the first pulse width).

In FIG. 2, while the pulse width corresponding to data "1" is substantially the same as that of FIG. 6, the pulse width corresponding to data "0" is set to be larger than that of FIG. 6. By thus setting both of the pulse corresponding to data "1" and the pulse corresponding to data "0" to have a relatively large width, the peak value of the output current I1 shown in FIG. 2 can be suppressed to a low level as compared to that shown in FIG. 6. This is because, by making the width of each pulse of the pulse voltage VA relatively large, the peak value of the charging current I5 can be suppressed. As a result, a voltage drop in the current detection resistor R1 in the data carrier driving apparatus 2 is alleviated, and as shown in FIG. 2, the amplitude voltage of the pulse voltage VA is secured without decreasing significantly.

(Uplink Data Communication)

In the present embodiment, at the time of data communication via the uplink, the master control unit 113 makes the duty ratio (Duty5) of each pulse of the pulse voltage VA even larger than the duty ratios (Duty3 and Duty4) for data downlink communication as shown in FIG. 2. That is to say, the master control unit 113 sets a per-period pulse width of the pulse voltage VA generated by the pulse generation circuit 114 to a pulse width (third pulse width) that is even larger than a larger one of the pulse widths for the downlink (the second pulse width) (in the present embodiment, Duty5=87.5% as shown in FIG. 2).

As shown in FIG. 2, when transmitting data "1", the microcomputer 111 in the data carrier apparatus 103 turns off the transistor Q1 during a time frame in which the pulse voltage VA detected by the CLK detection unit 104 is the high-level voltage (VH). On the other hand, when transmitting data "0", the microcomputer 111 turns on the transistor Q1 during a time frame in which the pulse voltage VA detected by the CLK detection unit 104 is the high-level voltage (VH). In this manner, data "0" or data "1" is transmitted to the data carrier driving apparatus 102 by the microcomputer 111 switching between on and off of the modulation current Imod flowing in the resistor R2 in accordance with transmission data to change the output current I1 flowing in the resistor R1.

At the time of uplink data communication, the CLK detection unit 104 in the data carrier apparatus 103 need not detect the pulse width (duty ratio) of each pulse of the pulse voltage VA that is input from the data carrier driving apparatus 102 via the first contact 200. Therefore, at the time of uplink data communication, the master control unit 113 at the data carrier driving apparatus 102 side can arbitrarily set the duty ratio of each pulse to the extent that the CLK detection unit 104 at the data carrier apparatus 103 side can detect the edges of the pulse voltage VA. The master control unit 113 can thus decrease the peak value of the charging current I5 by making the value of the duty ratio of each pulse as large as possible to the above extent. This makes it possible to reduce the modulation current Imod, and to prevent an increase in the output current I1 caused by the modulation current Imod upon turning on the transistor Q1. As a result, a decrease in the amplitude of the pulse voltage VA can be suppressed even in uplink data communication.

According to the present embodiment described above, at the time of downlink or the uplink data communication, the value of the duty ratio of each pulse of the pulse voltage VA that is supplied from the data carrier driving apparatus 102 to the data carrier apparatus 103 is set as large as possible. More specifically, the duty ratio of each pulse is set such that, in one period of the pulse voltage VA, a time frame in which the pulse voltage VA becomes VH is longer than or equal to a time frame in which the pulse voltage VA becomes VL. This makes it possible to suppress an increase in the peak value of the charging current I5 caused by an operation of the rectification smoothing circuit 120. As a result, a voltage drop in the current detection resistor R1 in the data carrier driving apparatus 102 can be alleviated, the amplitude of the pulse voltage VA can be secured, and stable data communication can be realized between the data carrier driving apparatus 102 and the data carrier apparatus 103.

In other words, a decrease in the amplitude of a clock pulse signal (pulse voltage) generated by the data carrier driving apparatus 102 can be suppressed even when a general-purpose microcomputer and a highly-functional memory are built in the data carrier apparatus 103 and a rectification smoothing circuit is used to supply a power supply voltage thereto. This makes it possible to prevent erroneous operations of a clock (pulse) detection circuit (CLK detection unit 104) in the data carrier apparatus 103, and hence to realize stable data communication.

Second Embodiment

A second embodiment realizes stable data communication between data carrier driving apparatus 102 and data carrier apparatus 103 by suppressing a decrease in the amplitude of the pulse voltage VA using a different method from the first embodiment. The following describes the second embodiment of the present invention with reference to FIG. 3. Note that configurations of the data carrier driving apparatus 102 and the data carrier apparatus 103 according to the second embodiment are similar to those according to the first embodiment. For simplicity, a description of portions that are similar to the first embodiment is omitted below; the following describes portions that are different from the first embodiment.

Figure 3:
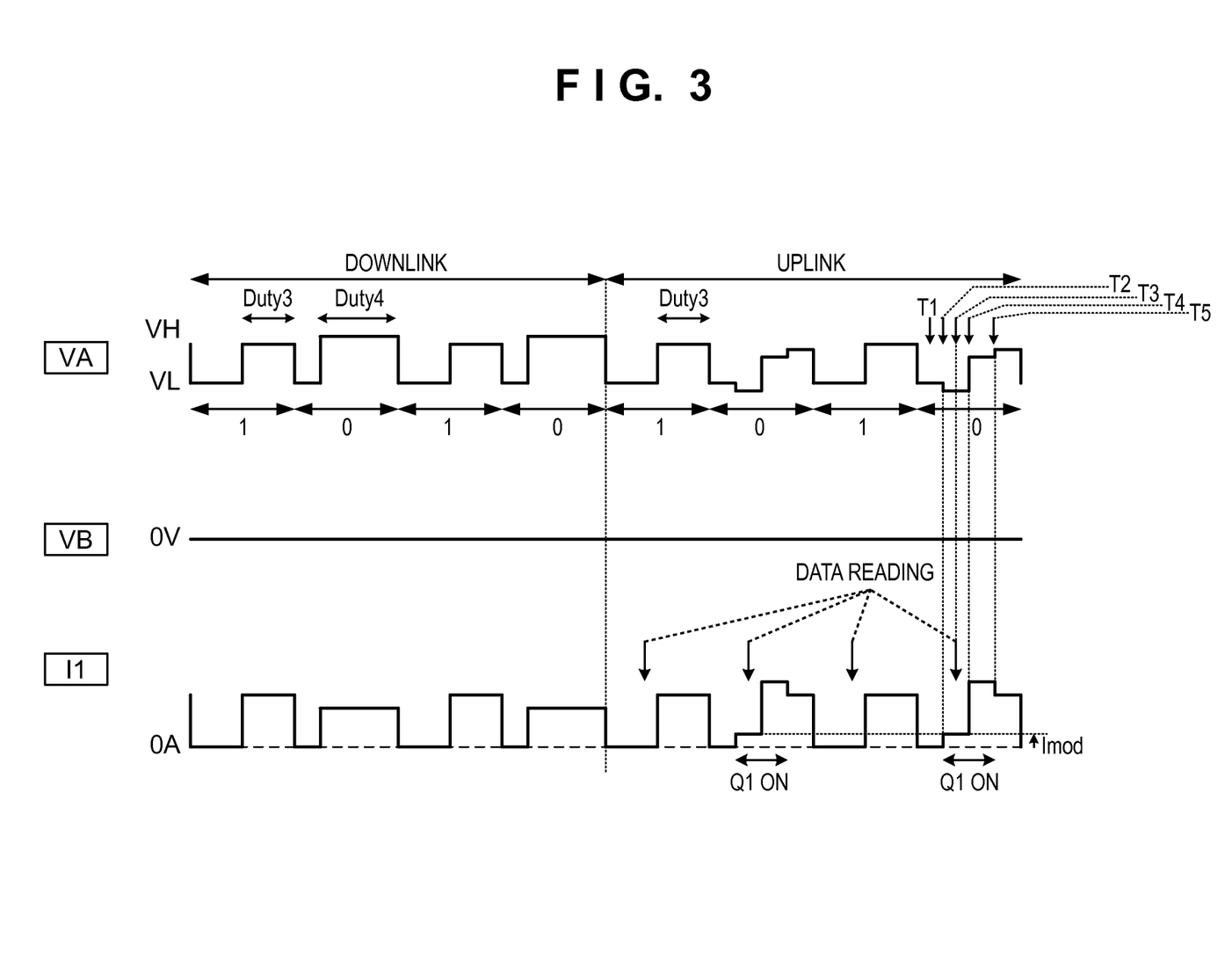
FIG. 3 shows examples of operational waveforms of components in the data communication system 100 according to the first embodiment of the present invention.

In the first embodiment, as shown in FIG. 2, a transmission period for transmitting each data is made up of a time frame in which the pulse voltage VA is a high-level voltage (VH) and a subsequent time frame in which the pulse voltage VA is a low-level voltage (VL) for both of the downlink and the uplink. In contrast, in the second embodiment, downlink and uplink data communication is performed by reversing the logics of VH and VL in the transmission period as shown in FIG. 3. That is to say, a transmission period for transmitting each data is made up of a time frame of VL and a subsequent time frame of VH.

(Downlink Data Communication)

As shown in FIG. 3, at the time of data communication via the downlink, the master control unit 113 operates in a manner similar to the first embodiment, except that the aforementioned transmission period is used. More specifically, the master control unit 113 sets the duty ratio as follows: when transmitting data "1", the duty ratio (Duty3) is 50% or more; when transmitting data "0", the duty ratio (Duty4) is larger than the duty ratio for transmission of data "1". FIG. 3 according to the present embodiment shows the case where Duty3=50% and Duty4=75% similarly to the first embodiment.

(Uplink Data Communication)

In the first embodiment, at the time of data communication via the uplink, the microcomputer 111 turns on or off the transistor Q1 in accordance with transmission data at a timing of data reading by the data carrier driving apparatus 102 (during a time frame in which the pulse voltage VA is VH). With this setting, the data carrier apparatus 103 transmits data to the data carrier driving apparatus 102. Also, as shown in FIG. 2, the pulse width of the pulse voltage VA for uplink data communication is set to be larger than the pulse width of the pulse voltage VA for downlink data communication (in FIG. 2, the duty ratio Duty5=87.5%).

On the other hand, in the second embodiment, the transistor Q1 is switched as follows at the time of uplink data communication: the transistor Q1 is turned on during a time frame in which the pulse voltage VA is a low-level voltage (VL); and the transistor Q1 is turned off during a subsequent time frame in which the pulse voltage VA is a high-level voltage (VH). Therefore, it is sufficient to set the duty ratio of each pulse of the pulse voltage VA so as to secure the time frames of VL and VH to the extent that switching of the transistor Q1 can be controlled. In the present embodiment, as one example, a duty ratio that has a smaller value (50%) out of the two duty ratios used for the downlink is used similarly for the uplink.

When transmitting data "1" (first data) via the uplink, the microcomputer 111 leaves the transistor Q1 off during one transmission period of the pulse voltage VA detected by the CLK detection unit 104. Consequently, the transistor Q1 is placed in a non-conductive state, and only the consumption current I2 flows in the resistor R1 as the output current I1. On the other hand, when transmitting data "0" (second data) via the uplink, in one transmission period of the pulse voltage VA detected by the CLK detection unit, the microcomputer 111 switches the transistor Q1 from off to on during a time frame of VL, and then switches the transistor Q1 from on to off during a subsequent time frame of VH.

At the time of uplink data communication, the master control unit 113 in the data carrier driving apparatus 102, which is a receiving side, identifies transmission data from the data carrier apparatus 103 based on the result of detection of a current that flows in the current detection resistor R1 during a time frame in which the pulse voltage VA is VL. That is to say, the master control unit 113 synchronizes a timing of data reading with a time frame in which the pulse voltage VA is VL.

A description is now given of the operations of the data carrier apparatus 103 in uplink data communication with reference to FIG. 3. As shown in FIG. 3, when transmitting data "1", the microcomputer 111 leaves the transistor Q1 off in one transmission period. On the other hand, when transmitting data "0", the transistor Q1 is turned on in one transmission period.

More specifically, when the pulse voltage VA changes from VH to VL, a new transmission period begins. At timing T1, the pulse voltage VA is VL, and therefore the CLK detection unit 104 determines that the CLK state with respect to the pulse voltage VA is a low level. Next, at timing T2 during a time frame of VL, the microcomputer 111 turns on the transistor Q1; consequently, the modulation current Imod starts to flow, and the level (VL) of the pulse voltage VA decreases accordingly. However, as the CLK state with respect to the pulse voltage VA is already a low level, the CLK detection unit 104 maintains the low level as the CLK state. Thereafter, at timing T3, the data carrier driving apparatus 102 detects reception data by detecting a current flowing in the current detection resistor R1 (data reading).

After the timing of data reading by the data carrier driving apparatus 102, the pulse voltage VA switches from VL to VH at timing T4. At this time, the CLK detection unit 104 determines that the CLK state with respect to the pulse voltage VA has switched from a low level to a high level, and holds the result of this determination. Thereafter, at timing T4, the microcomputer 111 turns off the transistor Q1; consequently, the modulation current Imod no longer flows, and the level (VH) of the pulse voltage VA increases. However, as the CLK state with respect to the pulse voltage VA is already a high level, the CLK detection unit 104 maintains the high level as the CLK state.

According to the present embodiment described above, at the time of uplink data communication, the CLK detection unit 104 does not erroneously detect the edges of the pulse voltage VA even when a voltage drop has occurred in the pulse voltage VA as a result of a change in the modulation current Imod caused by on/off of the transistor Q1. That is to say, similarly to the first embodiment, the CLK detection unit 104 can be prevented from erroneously detecting the falling edges as shown in FIG. 6.

According to the comparative example (FIG. 5) described above, the data carrier driving apparatus 102 synchronizes a timing of data reading with a time frame in which the pulse voltage VA is VH. In contrast, according to the present embodiment, a timing of data reading is synchronized with a time frame in which the pulse voltage VA is VL as described above. In order for the data carrier driving apparatus 102 to perform data reading during a time frame in which the pulse voltage VA is VH (that is to say, a time frame in which the charging current I5 flows), it is necessary to increase the modulation current Imod as in the comparative example. However, according to the present embodiment, the data carrier driving apparatus 102 performs data reading during a time frame in which the pulse voltage VA is VL (that is to say, a time frame in which the charging current I5 does not flow), and therefore the modulation current Imod can be set low as compared to the case of the comparative example. Furthermore, as the modulation current Imod can be set low, a voltage drop caused by the current detection resistor R1 is alleviated, and therefore the large amplitude of the pulse voltage VA can be secured. As a result, similarly to the first embodiment, a more stable communication quality can be realized between the data carrier driving apparatus 102 and the data carrier apparatus 103.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-276115, filed Dec. 18, 2012, which is hereby incorporated by reference herein in its entirety.

What is claimed is:

1. A data communication system including a data carrier driving apparatus and a data carrier apparatus that perform data communication via a first contact and a second contact, the data carrier apparatus comprising:
a rectification smoothing circuit configured to include a rectification element and a capacitance element, and to rectify and smooth a pulse voltage input from the data carrier driving apparatus via the first contact, and outputs the rectified and smoothed pulse voltage, the rectification element and the capacitance element being connected in series between the first contact and the second contact;
a pulse detection unit configured to detect the pulse voltage that is input from the data carrier driving apparatus and applied to the rectification smoothing circuit; and
a first control unit, that is connected to the rectification smoothing circuit, configured to operate using a voltage output from the rectification smoothing circuit as a power supply voltage, and to identify downlink transmission data from the data carrier driving apparatus to the data carrier apparatus based on a pulse width of the pulse voltage detected by the pulse detection unit,
the data carrier driving apparatus comprising:
a current detection element configured to detect a current flowing from the data carrier driving apparatus to the data carrier apparatus via the first contact as an output current corresponding to uplink transmission data from the data carrier apparatus to the data carrier apparatus;
a pulse generation circuit configured to generate a pulse voltage that periodically alternates between a high-level voltage and a low-level voltage using a voltage output to the data carrier apparatus via the second contact as a reference voltage, and to output the generated pulse voltage to the data carrier apparatus via the current detection element and the first contact; and
a second control unit configured to control the pulse generation circuit to set a per-period pulse width of the pulse voltage accordance with the downlink transmission data,
wherein the second control unit
when transmitting first data to the data carrier apparatus as the downlink transmission data, controls the pulse generation circuit to set the per-period pulse width to a first pulse width with which a time frame of the high-level voltage is longer than or equal to a time frame of the low-level voltage, and
when transmitting second data to the data carrier apparatus as the downlink transmission data, controls the pulse generation circuit to set the per-period pulse width to a second pulse width with which a time frame of the high-level voltage is longer than or equal to a time frame of the low-level voltage, the second pulse width being larger than the first pulse width Wherein the first data corresponds to a bit one and the second data corresponds to a bit zero or the first data corresponds to a bit zero and the second data corresponds to a bit one.

2. The data communication system according to claim 1, wherein
the data carrier apparatus further comprises:
a current load that is connected in parallel with the rectification smoothing circuit between the first contact and the second contact; and
a switching element that is connected in parallel with the rectification smoothing circuit and in series with the current load, between the first contact and the second contact, and configured to be switchable between a conductive state and a non-conductive state,
the first control unit switches a current flowing from the data carrier driving apparatus to the data carrier apparatus via the current detection element and the first contact between a consumption current flowing in the rectification smoothing circuit and a current that is obtained by adding to the consumption current a modulation current flowing in the current load, by switching a state of the switching element between the conductive state and the non-conductive state in accordance with the uplink transmission data, and
the second control unit identifies the uplink transmission data based on a result of detection of a current which flows in the current detection element and changes in accordance with the switching of the switching element.

3. The data communication system according to claim 1, wherein
the pulse generation circuit generates a reference voltage that keeps a constant level and generates the pulse voltage based on the generated reference voltage, and outputs the generated reference voltage to the data carrier apparatus via the second constant and outputs the generated pulse voltage to the data carrier apparatus via the current detection element and the first contact, the pulse voltage with respect to the reference voltage being applied to the rectification smoothing circuit.

4. The data communication system according to claim 1, wherein
when the uplink transmission data is transmitted from the data carrier apparatus to the data carrier driving apparatus, the second control unit controls the pulse generation circuit to set the per-period pulse width to a third pulse width which is larger than the first and second pulse widths.

5. The data communication system according to claim 2, wherein
the first control unit
when transmitting first data to the data carrier driving apparatus as the uplink transmission data, places the switching element in the conductive state during a time frame in which the pulse voltage detected by the pulse detection unit is the high-level voltage, and when transmitting second data to the data carrier driving apparatus as the uplink transmission data, places the switching element in the non-conductive state during a time frame in which the pulse voltage detected by the pulse detection unit is the high-level voltage, and when data is transmitted from the data carrier apparatus as the uplink transmission data, the second control unit controls the pulse generation circuit to the per-period pulse width of the pulse voltage to a third pulse width that is larger than the second pulse width.

6. The data communication system according to claim 2, wherein the first control unit when transmitting data to the data carrier driving apparatus as the uplink transmission data, sets a transmission period for transmitting each data such that the transmission period is made up of: a time frame in which the pulse voltage detected by the pulse detection unit is the low-level voltage; and a subsequent time frame in which the pulse voltage detected by the pulse detection unit is the high-level voltage, when transmitting first data to the data carrier driving apparatus as the uplink transmission data, places the switching element in the non-conductive state during the transmission period, and when transmitting second data to the data carrier driving apparatus as the uplink transmission data, switches the switching element from the non-conductive state to the conductive state during a time frame of the low-level voltage, and switches the switching element from the conductive state to the non-conductive state during a time frame of the high-level voltage, and the second control unit identifies the uplink transmission data based on a result of detection of a current flowing in the current detection element during a time frame in which the pulse voltage generated by the pulse generation circuit is the low-level voltage.

7. The data communication system according to claim 6, wherein when data is transmitted from the data carrier apparatus as the uplink transmission data, the second control unit controls the pulse generation circuit to set the per-period pulse width of the pulse voltage the first pulse width.

8. A data carrier driving apparatus that performs data communication with a data carrier apparatus via a first contact and a second contact, the data carrier driving apparatus comprising:

a current detection element configured to detect a current flowing from the data carrier driving apparatus to the data carrier apparatus via the first contact as an output current corresponding to uplink transmission data from the data carrier apparatus to the data carrier driving apparatus;

a pulse generation circuit configured to generate a pulse voltage that periodically alternates between a high-level voltage and a low-level voltage using a voltage output to the data carrier apparatus via the second contact as a reference voltage, and to output the generated pulse voltage to the data carrier apparatus via the current detection element and the first contact; and a control unit configured to control the pulse generation circuit to set a per-period pulse width of the pulse voltage in accordance with downlink transmission data from the data carrier driving apparatus to transmit data to the data carrier apparatus, wherein the control unit when transmitting first data to the data carrier apparatus as the downlink transmission data, controls the pulse generation circuit to the per-period pulse width to a first pulse width with which a time frame of the high-level voltage is longer than or equal to a time frame of the low-level voltage, and when transmitting second data to the data carrier apparatus as the downlink transmission data, controls the pulse generation circuit to set the per-period pulse width to a second pulse width with which a time frame of the high-level voltage is longer than or equal to a time frame of the low-level voltage, the second pulse width being larger than the first pulse width Wherein the first data corresponds to a bit one and the second data corresponds to a bit zero or the first data corresponds to a bit zero and the second data corresponds to a bit one.

9. A data carrier apparatus that performs data communication with a data carrier driving apparatus via a first contact and a second contact, the data carrier apparatus comprising:

a rectification smoothing circuit configured to include a rectification element and a capacitance element, and to rectify and smooth a pulse voltage input from the data carrier driving apparatus via the first contact, and outputs the rectified and smoothed pulse voltage, the rectification element and the capacitance element being connected in series between the first contact and the second contact, and the pulse voltage periodically alternating between a high-level voltage and a low-level voltage;

a pulse detection unit configured to detect the pulse voltage that is input from the data carrier driving apparatus and applied to the rectification smoothing circuit;

a control unit, that is connected to the rectification smoothing circuit, configured to operate using a voltage output from the rectification smoothing circuit as a power supply voltage, and to identify downlink transmission data from the data carrier driving apparatus to the data carrier apparatus based on a pulse width of the pulse voltage detected by the pulse detection unit;

a current load that is connected in parallel with the rectification smoothing circuit between the first contact and the second contact; and a switching element that is connected in parallel with the rectification smoothing circuit and in series with the current load, between the first contact and the second contact, and configured to be switchable between a conductive state and a non-conductive state, wherein the control unit when transmitting data to the data carrier driving apparatus as uplink transmission data from the data carrier apparatus to the data carrier driving apparatus, sets a transmission period for transmitting each data such that the transmission period is made up of: a time frame in which the pulse voltage detected by the pulse detection unit is the low-level voltage; and a subsequent time frame in which the pulse voltage detected by the pulse detection unit is the high-level voltage, when transmitting first data to the data carrier driving apparatus as the uplink transmission data, places the switching element in the non-conductive state during the transmission period, and when transmitting second data to the data carrier driving apparatus as the uplink transmission data, switches the switching element from the non-conductive state to the conductive state during a time frame of the low-level voltage, and switches the switching element from the conductive state to the non-conductive state during a time frame of the high-level voltage Wherein the first data corresponds to a bit one and the second data corresponds to a bit zero or the first data corresponds to a bit zero and the second data corresponds to a bit one.

* * * * *